United States Patent
Osborne

(10) Patent No.: US 7,107,833 B2
(45) Date of Patent: Sep. 19, 2006

(54) INERTIAL REFERENCE UNIT WITH INTERNAL BACKUP ATTITUDE HEADING REFERENCE SYSTEM

(75) Inventor: Michael J. Osborne, Crystal, MN (US)

(73) Assignee: Honeywell International Inc., Morristown, NJ (US)

( * ) Notice: Subject to any disclaimer, the term of this patent is extended or adjusted under 35 U.S.C. 154(b) by 98 days.

(21) Appl. No.: 10/744,422

(22) Filed: Dec. 23, 2003

(65) Prior Publication Data

US 2005/0150289 A1 Jul. 14, 2005

(51) Int. Cl.
*G01C 21/00* (2006.01)
(52) U.S. Cl. .................................... 73/178 R
(58) Field of Classification Search .............. 73/178 R, 73/493; 701/11
See application file for complete search history.

(56) References Cited

U.S. PATENT DOCUMENTS

| | | | |
|---|---|---|---|
| 4,085,440 A * | 4/1978 | Hose | 701/221 |
| 4,212,443 A * | 7/1980 | Duncan et al. | 244/177 |
| 4,384,487 A * | 5/1983 | Browning | 73/382 G |
| 4,844,383 A | 7/1989 | Hassenpflug | |
| 4,914,598 A * | 4/1990 | Krogmann et al. | 701/11 |
| 5,297,052 A | 3/1994 | McIntyre et al. | |
| 5,363,700 A * | 11/1994 | Joly et al. | 73/504.18 |
| 5,483,455 A | 1/1996 | Lay et al. | |
| 5,493,497 A * | 2/1996 | Buus | 701/4 |
| 5,631,656 A | 5/1997 | Hartman et al. | |
| 5,719,764 A | 2/1998 | McClary | |
| 5,880,368 A * | 3/1999 | FitzPatrick | 73/493 |

* cited by examiner

*Primary Examiner*—Edward Lefkowitz
*Assistant Examiner*—Jermaine Jenkins
(74) *Attorney, Agent, or Firm*—Dina Khaled, Esq.; Armstrong Teasdale LLP

(57) ABSTRACT

An inertial reference unit (IRU) is described which includes a processor programmed to provide inertial data from received inertial signals, a primary sensor unit providing the inertial signals to the processor, and an input/output (I/O) unit communicatively coupled to the processor. The I/O unit provides signals, including inertial data, to an external interface of the IRU and routes signals to and from the processor. The inertial reference unit also includes a secondary sensor unit separate from the primary sensor unit which provides inertial data independent of the inertial data provided by the processor.

18 Claims, 4 Drawing Sheets

INERTIAL REFERENCE UNIT WITH INTERNAL BACKUP ATTITUDE HEADING REFERENCE SYSTEM

BACKGROUND OF THE INVENTION

This invention relates generally to aircraft navigation, and more specifically, to an inertial reference unit which provides an independent, backup source of inertial data, for example, an attitude heading reference system (AHRS).

Aircraft utilize attitude sources (i.e. inertial reference units (IRUs) and attitude heading reference systems (AHRS)) which provide pitch, roll and heading information along with aircraft accelerations and angular body rates to various displays and/or systems in the aircraft in order to perform certain flight operations. Availability of this information is especially critical during certain flight operations such as landing in poor weather conditions.

Some of these sources of attitude and heading information are redundant to provide a measure of safety in case of equipment failure and provide for confirmation of correct readings. Dispatch of aircraft also is sometimes dependent upon the availability of redundant systems which provide attitude and heading information. For example, an aircraft may not be available for flight without two or more independent sources of attitude and heading information. In some areas of the world, replacement units to provide attitude and heading information are not readily available for installation in an aircraft. Therefore, it is possible that an aircraft may risk unsafe operations by resuming flight while not being equipped with the proper complement of attitude and heading sources. Alternatively, the aircraft could be stranded, waiting for a shipment of replacement attitude and heading sources if one or more of its attitude heading reference units are inoperable.

Aircraft are typically designed to house a particular suite of avionics instruments. Therefore, existing aircraft cannot easily add additional inertial reference units (IRUs) or attitude heading reference systems (AHRS) to their avionics suites due to space concerns, wiring and available input channels of the flight display, flight management and flight control systems. Reversionary modes, for example, an attitude mode in certain known IRUs are not available if sensor or other essential hardware in the IRU cause the unit to fail. In addition, such reversionary modes are also sometimes difficult for a flight crew to enable.

BRIEF SUMMARY OF THE INVENTION

In one aspect, an inertial reference unit (IRU) is provided which comprises a processor programmed to receive inertial data from inertial sensors and provide attitude and navigation solutions based on the received inertial data, a primary sensor unit which includes gyroscopes and accelerometers that provide inertial signals to the processor, an input/output (I/O) unit and a secondary sensor unit separate from the sensor unit. The I/O unit is communicatively coupled to the processor and provides attitude and position data to an external interface of the IRU. The secondary sensor unit provides separate and independent inertial attitude and navigation solutions from its own set of sensors.

In another aspect, a method for adding an additional source of inertial data for output from an inertial reference unit (IRU) is provided. The IRU includes a primary source of inertial data and the method comprises installing a secondary sensor unit into a chassis of the IRU and multiplexing the inertial data from the primary source of inertial data and the inertial data from the secondary sensor unit to an inertial data output of the IRU.

In still another aspect, a method for multiplexing sources of inertial data to existing busses and interfaces of an aircraft is provided. The method comprises installing a secondary sensor unit into a chassis of a source of inertial data and installing switching logic to multiplex the inertial data from primary source of inertial data and the inertial data from the secondary sensor unit to an inertial data output.

DETAILED DESCRIPTION OF THE INVENTION

Figure 1:
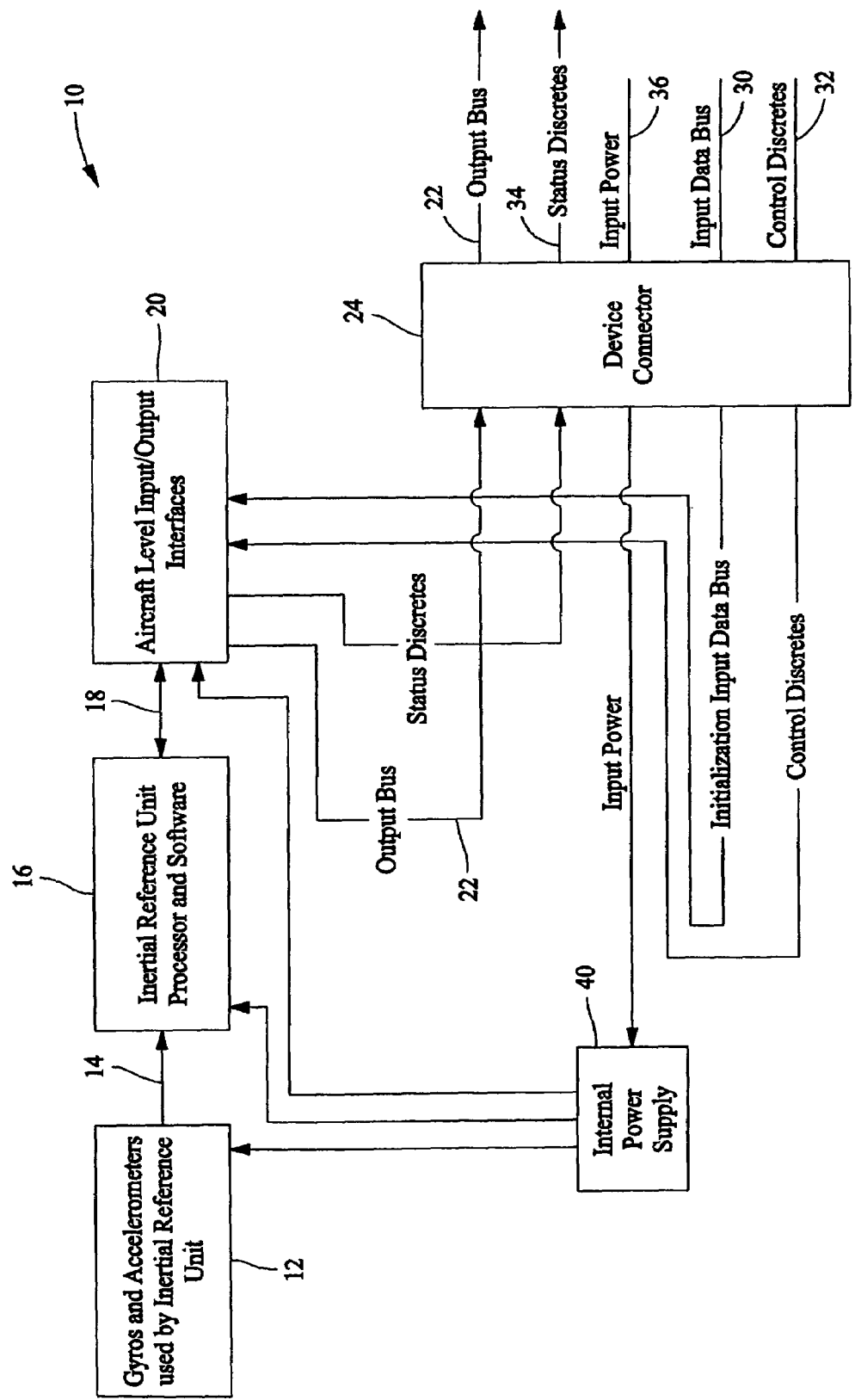
FIG. 1 is a block diagram of an inertial reference unit.

FIG. 1 is a block diagram of a known inertial reference unit (IRU) 10. IRU 10 includes a sensor unit 12 which typically includes one or more of gyroscopes and accelerometers which provide inertial signals 14 to processor 16. Sensor unit 12 is sometimes referred to herein as a primary sensor unit. Processor 16 is programmed, at least in part, to take inertial signals 14 from processor 16 and output inertial data 18 to input/output (I/O) unit 20. I/O unit 20 routes inertial data 18 to an output bus 22 which is connected to a connector 24 of IRU 10, thereby providing inertial data 18 to other systems within an aircraft, including a display presented to a pilot of the aircraft. As used herein, inertial data includes attitude data (e.g. pitch, roll, and heading of the aircraft).

Other functional interfaces are provided at connector 24 of IRU 10, including, but not limited to, an input data bus 30, control discretes 32, status discretes 34, and input power 36. Input power 36 is routed to an internal power supply 40 which generates the specific power requirements for each of sensor unit 12, processor 16, and input/output (I/O) unit 20.

IRU 10 is housed in a chassis (not shown), which conforms to particular form factor requirements, for example, for fitting within a particular mounting apparatus mounted in an airframe. The chassis and mounting apparatus includes features for securing IRU 10 in accurate alignment with the aircraft body thereby providing an attitude reference with respect to the aircraft body. Examples of form factors for known IRUs, such as IRU 10, include four MCU and ten MCU. MCU Stands for Modular Concept Unit, which is an industry standard for air transport avionics. A ten MCU chassis is about 12.69 inches wide, 12.5 inches deep and about 7.64 inches high. All of the MCU form factors are the same height and depth. A four MCU chassis is about 4.88 inches wide. In addition, other, smaller non-standard form factors are also used for the mounting of IRUs. One example of a known IRU 10 which has a ten MCU form factor is the Honeywell HG1050 Inertial Reference Unit which incorporates ring laser gyroscopes.

Figure 2:
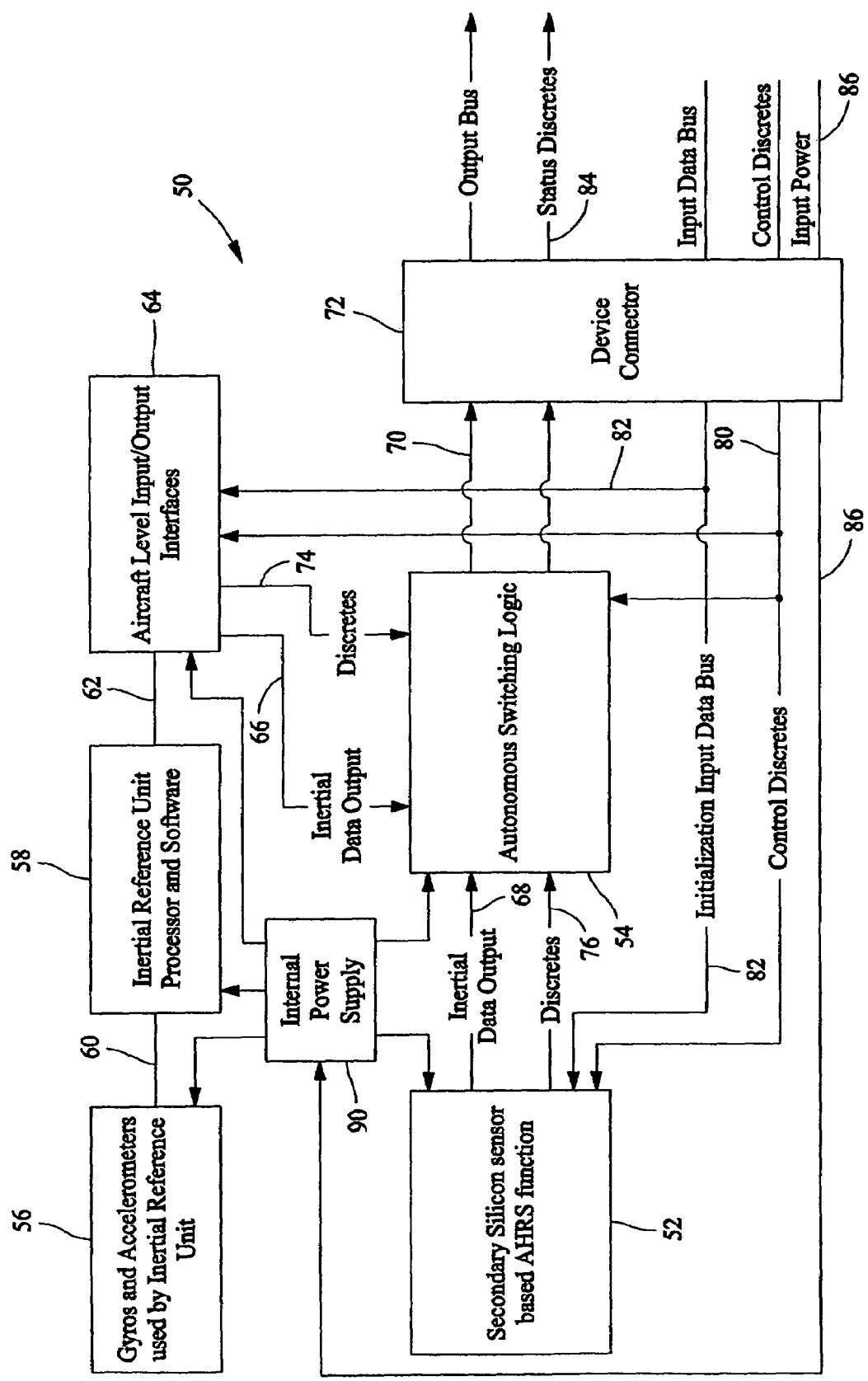
FIG. 2 is a block diagram of an inertial reference unit which incorporates a secondary sensor unit.

FIG. 2 is a block diagram of an inertial reference unit (IRU) 50 which is housed in a chassis (not shown) which conforms to the existing form factors (e.g. 4 MCU, 10 MCU) for IRU 10 (shown in FIG. 1). IRU 50 also incorporates, internally, a separate attitude heading and reference unit 52 and switching logic 54. Attitude heading and reference unit 52 is sometimes referred to herein as a secondary sensor unit. In one embodiment, attitude heading and reference unit 52 generates inertial data, for example, a heading, aircraft body rates, accelerations and aircraft attitude information.

As shown in FIG. 2, attitude heading and reference unit 52 provides inertial data through existing aircraft interfaces and information busses in the case the primary inertial reference unit sensors (e.g. primary sensor unit 56) or inertial reference operations (e.g. processor 58) fail. Specifically, IRU 50 includes a primary sensor unit 56. One known sensor unit 56 includes three gyroscopes and three accelerometers which provide inertial signals 60 to processor 58. Processor 58 is programmed to take inertial signals 60 from primary sensor unit 56 and output inertial data 62 to input/output (I/O) unit 64. I/O unit 64 routes inertial data 62 to an inertial data output 66 which is connected to switching logic 54. Attitude heading and reference unit 52 also provides an inertial data output 68 that is connected to switching logic 54. In one embodiment, switching logic 54 is configured to switch output bus 70 from inertial data output 66 to inertial data output 68 from attitude heading and reference unit 52 if one or more of primary sensor unit 56, processor 58, and I/O unit 64 have failed. Output bus 70 routes the inertial data (e.g. one of inertial data output 66 and inertial data output 68) through connector 72 so the inertial data can be routed to other systems within an aircraft.

In one embodiment, discretes 74 from I/O unit 64 and discretes 76 from attitude heading and reference unit 52 are used by switching logic 54 to determine which of the two inertial data outputs 66 and 68 are to be routed through connector 72. In another embodiment, control discretes 80, which are routed to switching logic 54, I/O unit 64, and attitude heading and reference unit 52 and can be set external to IRU 50 to select which source of inertial output data is selected.

Other functional interfaces are provided at connector 72 of IRU 50, including, but not limited to, an input data bus 82, status discretes 84, and input power 86. Specifically, status discretes may be input to an external controller (not shown) which then set control discretes 80 to select the source of inertial data output as described above. Input power 86 is routed to an internal power supply 90 which generates the specific power requirements for each of sensor unit 52, processor 58, input/output (I/O) unit 64, attitude heading and reference unit 52, and switching logic 54. Alternately, a separate power supply or externally regulated power may be provided to attitude heading and reference unit 52 and switching logic 54 without sharing the internal power supply 90 with the IRU. Such a power configuration reduces an amount of modification needed to implement attitude heading and reference unit 52 and switching logic 54 within an existing IRU.

Figure 3:
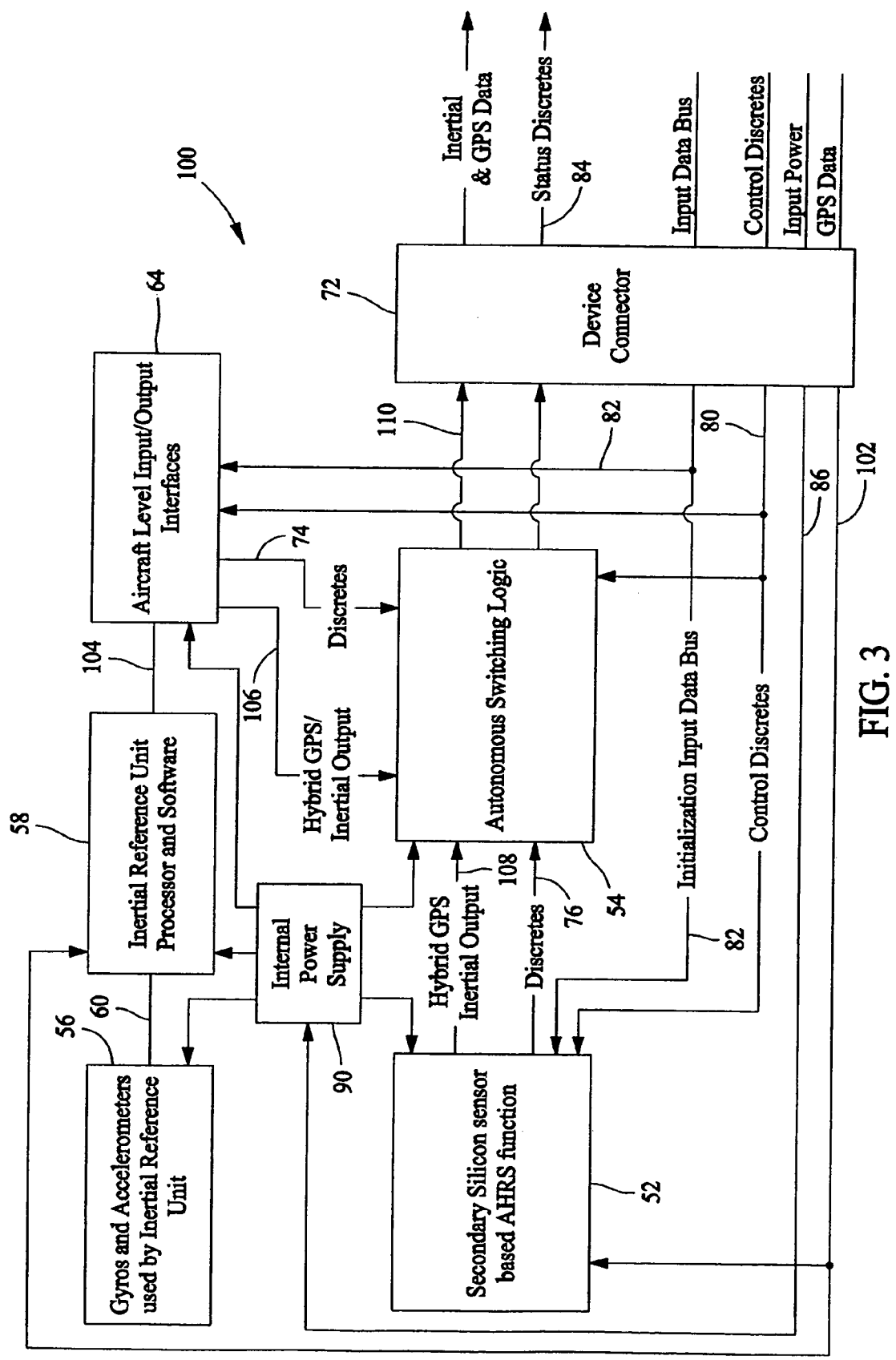
FIG. 3 is a block diagram of an inertial reference unit which incorporates a secondary sensor unit and GPS data.

FIG. 3 is a block diagram of an inertial reference unit 100 which incorporates a secondary sensor unit (e.g., attitude heading and reference unit 52) and which optionally receives GPS data 102. Receipt of GPS data 102 allows IRU 100 to provide inertial data having hybrid GPS/inertial data navigation solutions and provides a position reference source for correcting inertially computed position and velocity outputs. GPS data 102 is received, in one embodiment, at both attitude heading and reference unit 52 and at processor 58. Processor 58 then provides hybrid GPS and inertial data 104 to I/O unit 64. A hybrid GPS/inertial data output 106 is routed to switching logic 104 which also receives a hybrid GPS/inertial data output 108 from attitude heading and reference unit 52. Based on which is providing the inertial data as described above, attitude heading and reference unit 52 or I/O unit 64, hybrid GPS/ inertial data 110 is provided at connector 72.

In order to retain the form factor of the chassis of IRU 10 (shown in FIG. 1), attitude heading and reference unit 52 and switching logic 54 of IRUs 50 and 100 are necessarily small in size. Therefore, in a specific embodiment, attitude heading and reference unit 52 includes physically small gyroscope and accelerometer sensors. One exemplary type of physically small sensors are micro-electromechanical systems (MEMS) device sensors. One MEMS gyroscope is known to be fabricated on a die that is about one millimeter by about 1.5 millimeter and packaged in a 10 pin leadless chip carrier. While MEMS sensors are described herein, other physically small sensors may be utilized in attitude heading reference unit 52. Certain MEMS devices, (e.g., MEMS gyroscopes and MEMS accelerometers) are known to be capable of computing aircraft attitude, acceleration and body rates with sufficient accuracy to enable them to be a source of inertial data and to enable aircraft operation in the event of a failure of the primary inertial data source.

This small inertial package (e.g. MEMS device sensors), integrated with other inertial reference unit components, each sending its inertial data output to switching logic 54, provide a backup function and source of inertial data. The modified I/O hardware (e.g., switching logic 54) enable operation of the backup function by providing a controllable switch allowing selection of the source of inertial data.

Figure 4:
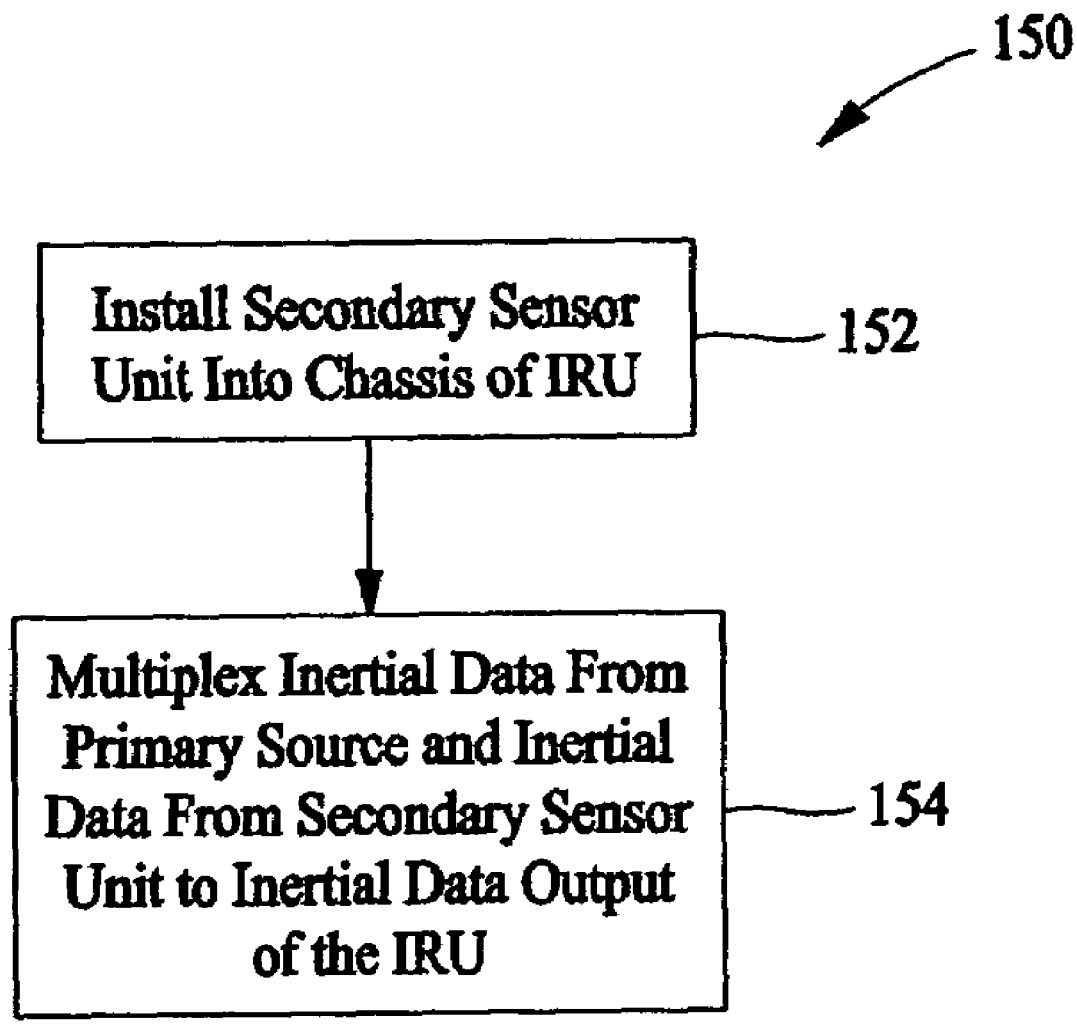
FIG. 4 is a flowchart illustrating a method for adding an additional source of inertial data to an inertial reference unit.

FIG. 4 is a flowchart 150 illustrating a method for adding an additional source of inertial data to an inertial reference unit (IRU), for example, IRU 50 (shown in FIG. 2). A secondary sensor unit (e.g., attitude heading and reference unit 52) is installed 152 into the chassis of the IRU, and inertial data from the primary source of inertial data (e.g. inertial data output 66) is multiplexed 154 with the inertial data from the secondary sensor unit (e.g. inertial data output 68) to an inertial data output of the IRU (e.g. output bus 70).

As described above, aircraft are typically designed to house a particular suite of avionics instruments, and expansion of that suite is typically undesirable due to space concerns, availability of interfaces of existing avionics (i.e., flight display, flight management and flight control systems), and the problems associated with the addition of additional wiring for additional avionics. As a result, existing aircraft cannot easily add additional inertial reference units (IRUs) or attitude heading reference systems (AHRS) to their avionics suites While vehicles such as aircraft generally lack capabilities for expanding their avionics suites as above described, it is known that some inertial reference units, which are housed in an established form factor chassis (e.g., a ten MCU chassis), have substantial amounts of space within the chassis. One reason is due to redesign of electronic assemblies housed within these chassis as larger scale integrated circuits and custom logic chips have become available. Another possible reason is purposeful room left for future expansion within the chassis. Multiplexing of inertial data from a MEMS attitude sensor, for example, with inertial data provided by an IRU provides a desired redundant source of attitude and heading data within these units. While some wiring changes and input/output circuit changes are required within the existing device (IRU), these existing devices are adaptable such that a secondary source of attitude and heading data can be added to these existing devices (e.g., a MEMS attitude sensor). The resulting device is form, fit, and functionally interchangeable into existing aircraft applications, while also providing the additional redundancy offered by the backup AHRS function of the MEMS attitude sensor.

While the invention has been described in terms of various specific embodiments, those skilled in the art will recognize that the invention can be practiced with modification within the spirit and scope of the claims.

What is claimed is:

1. An inertial reference unit (IRU) comprising:
   a processor programmed to provide inertial data from received inertial signals;
   a primary sensor unit comprising one or more gyroscopes and one or more accelerometers providing the inertial signals to said processor;
   an input/output (I/O) unit communicatively coupled to said processor and providing signals, including inertial data, to an external interface of said IRU, said I/O unit routing signals to and from said processor; and
   a secondary sensor unit separate from said primary sensor unit, said secondary sensor unit providing inertial data independent of the inertial data provided by said processor.

2. An IRU according to claim 1 wherein said secondary sensor unit provides inertial data comprising one or more of heading, aircraft body rates, acceleration rates, and aircraft attitude.

3. An IRU according to claim 1 wherein said secondary sensor unit provides inertial data to existing aircraft interfaces and information busses through the external interface of said IRU.

4. An IRU according to claim 1 further comprising switching logic, said switching logic configured to switch between said secondary sensor unit and said I/O unit as the source of inertial data at the external interface of said IRU.

5. An IRU according to claim 4 wherein said secondary sensor unit and said switching logic are mounted on a circuit card, the circuit card configured for insertion into an expansion slot of a chassis of said IRU.

6. An IRU according to claim 1 wherein said secondary sensor unit comprises at least one micro-electromechanical systems (MEMS) device.

7. An IRU according to claim 1 further comprising a chassis, said chassis having one of a four MCU dimension and a ten MCU dimension.

8. An IRU according to claim 1 wherein said secondary sensor unit is configured to integrate GPS position into the inertial data provided by said secondary sensor unit.

9. A method for adding an additional source of inertial data to an inertial reference unit (IRU), the IRU including a primary source of inertial data, said method comprising:
   installing a secondary sensor unit into a chassis of the IRU;
   multiplexing the inertial data from the primary source of inertial data and the inertial data from the secondary sensor unit to an inertial data output of the IRU; and
   integrating GPS position data into the inertial data provided by the secondary sensor unit.

10. A method according to claim 9 wherein installing a secondary sensor unit comprises installing a micro-electromechanical systems (MEMS) device within the chassis of the IRU.

11. A method according to claim 9 wherein multiplexing the inertial data comprises installing switching logic in the IRU, the switching logic configured to switch between the inertial data from the primary source of inertial data and the inertial data from the secondary sensor unit as the inertial data output of the IRU.

12. A method according to claim 11 further comprising:
   configuring a circuit card with the secondary sensor unit and the switching logic; and
   installing the circuit card within the IRU.

13. A method according to claim 11 further comprising routing power for the secondary sensor unit and the switching logic through an external connector of the IRU.

14. A method according to claim 9 further comprising:
   configuring a circuit card with the secondary sensor unit; and
   installing the circuit card within the IRU.

15. A method for multiplexing sources of inertial data to existing busses and interfaces of an aircraft, said method comprising:
   installing a secondary sensor unit that includes at least one micro-electromechanical systems (MEMS) device into a chassis of a primary source of inertial data; and
   installing switching logic to multiplex the inertial data from a primary source of inertial data and the inertial data from the secondary sensor unit to an inertial data output.

16. A method according to claim 15 further comprising utilizing the switching logic to switch from the primary source of inertial data to the secondary sensor unit upon a failure of the primary source of inertial data.

17. A method according to claim 16 wherein utilizing the switching logic to switch comprises utilizing the switching logic to monitor a discrete signal from the primary source of inertial data, the discrete changing state upon a failure of the primary source of inertial data.

18. A method according to claim 15 further comprising supplying power for the switching logic and the secondary sensor unit from an external source, through connectors of the chassis of the primary source of inertial data, to the switching logic and the secondary sensor unit.

* * * * *